United States Patent [19]

LeBlanc, Jr.

[11] Patent Number: 4,572,810
[45] Date of Patent: Feb. 25, 1986

[54] METHOD FOR PROVIDING URANIUM HYDROXIDE ON $UO_2$ PARTICLES PRIOR TO GENERATION OF FUGITIVE BINDER FOR SINTERING

[75] Inventor: Oliver H. LeBlanc, Jr., Schenectady, N.Y.

[73] Assignee: General Electric Company, Schenectady, N.Y.

[21] Appl. No.: 651,499

[22] Filed: Sep. 17, 1984

[51] Int. Cl.$^4$ ............................................. G21C 21/00
[52] U.S. Cl. ...................................... 264/0.5; 264/56; 423/260; 501/1; 501/80; 501/152
[58] Field of Search ................... 264/56, 0.5; 423/260; 501/80, 152

[56] References Cited

U.S. PATENT DOCUMENTS

| | | | |
|---|---|---|---|
| 4,427,579 | 1/1984 | Gaines et al. | 264/0.5 |
| 4,432,915 | 2/1984 | Gallivan | 264/0.5 |
| 4,472,512 | 9/1984 | Lane et al. | 264/0.5 |

*Primary Examiner*—Helen M. McCarthy
*Attorney, Agent, or Firm*—James Magee, Jr.; James C. Davis, Jr.

[57] ABSTRACT

$UO_2$ particles are brought into contact with liquid water of low pH in an oxidizing environment to dissolve uranyl hydroxide from the particle surfaces and cause more uranyl hydroxide to form and be dissolved. When sufficient uranyl hydroxide has entered the solution, the pH is raised to cause uranyl hydroxide to leave the solution and deposit on the $UO_2$ particles. The particles are then ready for contact with an appropriate reactant to form a fugitive binder.

5 Claims, No Drawings

METHOD FOR PROVIDING URANIUM HYDROXIDE ON $UO_2$ PARTICLES PRIOR TO GENERATION OF FUGITIVE BINDER FOR SINTERING

FIELD OF THE INVENTION

The present invention relates generally to the ceramic art and specifically to the production of uranium oxide powder/binder mixtures, which can be compacted to provide green bodies for subsequent sintering.

BACKGROUND OF THE INVENTION

This invention is an improvement over the invention disclosed in U.S. Pat. No. 4,427,579—Gaines, Jr. et al. In the Gaines, Jr. et al. invention, amine carbonate or amine carbamate is added to particulate nuclear fuel such that a reaction occurs that forms a water-soluble compound effective as a fugitive binder for the preparation of compact of the nuclear fuel material. The preferred amine compound is ethylene diamine carbamate (abbreviated herein as ECM). The Gaines, Jr. et al. patent is incorporated by reference.

Various materials are used as nuclear fuels for nuclear reactions including ceramic compounds of uranium, plutonium and thorium with particularly preferred compounds being uranium oxide, plutonium oxide, thorium oxide and mixtures thereof. An especially preferred nuclear fuel for use in nuclear reactors is uranium dioxide.

Uranium dioxide is produced commercially as a fine, fairly porous powder, which cannot be used directly as nuclear fuel. It is not a free-flowing powder, but is one which clumps and agglomerates, making it difficult to pack in reactor tubes to the desired density.

The specific composition of a given commercial uranium dioxide powder may also prevent it from being used directly as a nuclear fuel. Uranium dioxide is an exception to the law of definite proportions since "$UO_2$" actually denotes a single, stable phase that may vary in composition from $UO_{1.7}$ to $UO_{2.25}$. Because thermal conductivity decreases with increasing O/U ratios, uranium dioxide having as low as O/U ratio as possible is preferred. However, because uranium dioxide powder oxidizes easily in air and absorbs moisture readily, the O/U ratio of this powder is significantly in excess of that acceptable for fuel.

$UO_2$ powder synthesized by different methods from uranium hexafluoride gas can exhibit different characteristics, when the $UO_2$ powder is made into nuclear fuel pellets. As a result, the $UO_2$ powder may exhibit poor pressibility and require a binding agent in order to form suitable green pellets. The green pellet properties are of particular importance when the powder compacting is conducted in a rotary press. The binder described in the Gaines, Jr. et al. patent is particularly effective. Green pellets prepared therewith exhibit a good combination of tensile strength and plasticity.

In the practice of the Gaines, Jr. et al. invention, a particulate mix of $UO_2$ requiring the presence of a binder in order to prepare suitable green pellets therefrom is mixed with the amine compound, which is added either as a solid or as a concentrated aqueous solution. The amine compound is substantially uniformly distributed throughout the particulate $UO_2$ preparatory to the conduct of a reaction to form amine uranyl compounds as the binder material. The reaction temperature to form the amine uranyl compound is maintained at a fairly constant value at atmospheric pressure. The temperature employed can be as low as 68°–72° F. although moderate heating may be desirable. Water, or a source of water in the form of a higher than normal humidity is necessary to carry the reaction to completion. This is conveniently provided in the form of the solvent phase of a solution of the amine carbonate or carbamate added to the particulate fuel. Water may, of course, be added as bulk water, i.e., liquid, or as vapor. The amount of amine carbonate or carbamate (or mixture thereof) added is in the range of from about 0.5% to about 7% by weight of the particulate nuclear fuel. The reacted mass is dried to a water content of about 4000 parts per million before the green pellets are prepared therefrom. The drying is accomplished by passing a stream of dry nitrogen gas through the mixture.

Sintered fuel pellets are required to be slightly porous so that they can accomodate gaseous products generated during the nuclear fission. Sinter densities should typically be in the range of 95–96% of theoretical. In the event that the particulate nuclear fuel is one which sinters to produce a pellet with density that is higher than is desirable, it is necessary to add a pore-forming agent along with the amine compound. As with the binder material, the pore-former must leave the pellet during the sintering operation and leave no residue. Ammonium oxalate is the preferred pore-former.

DESCRIPTION OF THE INVENTION

When $UO_2$ powders are exposed to air at room temperature, the uranium atoms at the particle surfaces undergo oxidation to the hexavalent state. At typical ambient atmospheric relative humidities, and at temperatures below about 50° C., the stable form of the hexavalent oxide ($UO_3$) is the dihydrate having the emperical formula $UO_3.2H_2O$. X-ray crystal structure studies of this material show that the dihydrate is a salt, uranyl hydroxide monohydrate, $UO_2(OH)_2.H_2O$. When the temperature of this material is raised above 50° C., it begins to lose water progressively and at temperatures above about 450° C. dehydration is completed to yield $UO_3$.

Thus, in the conduct of the process described in the Gaines, Jr. et al. patent, the surface of $UO_2$ particles with which the amine carbonate or amine carbamate is mixed have a very thin layer of hexavalent uranium on the surface thereof in the form of uranyl hydroxide. Some, and possibly all, of the hexavalent uranium present under suitable pH conditions will dissolve when the powder is treated with ECM (or ECM and ammonium oxalate) going into solution in the water which is present. When water is removed in the drying step, uranyl salts and all other solutes will precipitate as their respective solubility limits are exceeded. If the pH of the solution should increase at this stage of the process, for example through the loss of carbon dioxide, then these precipitates will include uranyl hydroxides. The extent to which this happens is unknown. Quantities of soluble hexavalent uranium in the range of from about 1 to about 2 wt% (i.e., % of particle weight) are present on the surface of $UO_2$ particles prior to treatment with the amine compound. The exact nature of chemical reactions involved in the interaction of the $UO_2$ particles and the amine carbonate or amine carbamate (and, when present, with the ammonium oxalate) were unknown as, manifestly, was the constituent or constituents of the resulting binder phase, which provides the effective bonding action.

This invention arose during the attempt to understand the aforementioned chemical reactions and determine at least qualitatively the makeup of the binder phase. It was hypothesized that the $UO_2$ particles entering the reaction are covered with uranyl hydroxide and that this chemical substance when exposed to amine carbonate or amine carbamate and ammonium oxalate reacts to form uranyl carbonate (or carbamate) and oxalate complexes in concentrated solution in the water, that must be present for the reaction. It was predicted that when water is removed during the drying step, a non-stoichiometric mixture of salts precipitate as a solid out of solution and that this solid is the binder phase.

Test tube models were synthesized utilizing uranyl hydroxide, water and ECM in the conduct of the process conditions defined in the Gaines, Jr. et al. invention. The uranyl hydroxide was dissolved in 50:50 ECM:water solutions at pH of 8.5 and a temperature of 50° C. to give clear yellow solutions. When water was removed from these solutions, contrary to prediction, no solid at all precipitated. Instead, the solution simply became more and more viscous. As the viscosity increased, water removal became slower and slower. Eventually, when 70–80% of the water had been removed, the solution had the consistency of taffy (viscosities ranging from $10^4$ to about $10^5$ cP) and water removal was virtually nil. The resulting composition is a very complex, concentrated aqueous solution. When ammonium oxalate as well as ECM was present, a white precipitate, presumably ammonium oxalate (AO) itself, formed as well. This resulting viscous liquid, forming either with or without ammonium oxalate is a prototypical adhesive, i.e., it is a sticky, viscus fluid effective as a binder and also conferring plasticity, a very desirable attribute.

Controls were run by drying ECM/water and ECM/AO/water solutions in which no uranyl hydroxide had been dissolved. When water was removed from these, crystallization occurred sharply, as expected, when saturation was reached, and the ECM or AO or both precipitated out cleanly as solids, leaving a clear supernatent liquid.

Based upon these results, it was concluded that the presence of uranyl hydroxides in the binder is, in fact, important to the effectiveness of the binder phase and the presence thereof in predetermined amounts should be assured in a controllable fashion. This invention is directed to that objective.

This improvement in the Gaines, Jr. et al. invention consists of preparing the surface of the $UO_2$ particles in two steps whereby a predetermined amount of hexavalent uranium is caused to precipitate from solution onto the particle surfaces, the precipitate so obtained containing the desired content of uranyl hydroxides. The particle so prepared when contacted with an amine carbonate or an amine carbamate to form the fugitive binder phase will contain a substantially reproducible amount of uranyl hydroxide.

The process of the invention is conducted by exposing the particles of $UO_2$ to an oxidizing reagent in solution in low pH liquid water, or in solution in a liquid solvent containing low pH water, causing any pre-existing hexavalent uranium on the surfaces of the particles to go into solution as uranyl ions, or as a complex of uranyl ions. Thereafter the oxidation produces more hexavalent uranium which, in turn, dissolves. When sufficient uranyl hydroxide has dissolved, the pH of the solution is raised to at least about 5 causing hexavalent uranium to precipitate from the solution onto the particle surfaces as uranyl hydroxide. Whereas the typical amount of soluble uranium on the surfaces of the $UO_2$ particles from contact with air will be in the range of from about 1 to about 2 wt%, by the practice of this invention, it is expected that the amount of uranyl hydroxide on the particle surfaces can be reproducibly increased to be in the range of from about 2 to about 3 wt%. The result of such increase, should be a significant increase in the tensile strength of green pellets prepared using particulate uranium oxide subjected to the process of this invention.

METHOD AND PROCESS OF MAKING AND USING THE INVENTION

In the preparation of $UO_2$ particles by this invention, these particles, which had previously been exposed to air, are brought into contact with liquid water of sufficiently strong acidity, i.e., pH of 2 or less, which results in dissolution of the hexavalent uranium in the form of uranyl hydroxide from the surface of the particles and, providing that there is an oxidizing agent present as is required in this invention, additional hexavalent uranium ions are caused to form at the surface and these ions in turn go into solution as uranyl ions as long as the reaction is permitted to proceed.

It is imperative that any binder phase used to promote the production of sintered fuel pellets must not contain constituents that will result in contamination of the sintered pellet. For this reason, composition constituents are selected that will be converted to gases during the sintering step. This constraint severely limits the materials that can be used to establish the initial low pH, oxidizing environment and then to effect the succeeding rise in pH. Two materials suitable for the practice of this invention are nitric acid to provide simultaneous low pH and oxidizing action and ammonium hydroxide to raise the pH.

EXAMPLE 1

The extent of solubility of uranyl hydroxide in water was determined by mixing 0.1 g $UO_2(OH)_2.H_2O$ with 10 g $H_2O$ in a stoppered Erlenmeyer flask at 50° C. and stirring overnight. No dissolution occurred, i.e., the water remained colorless.

EXAMPLE 2

The solubility of uranyl hydroxide in acid was determined by adding 0.2 g $UO_2(OH)_2.H_2O$ to 10 ml 1N HCl (pH=0) at room temperature. It dissolved completely within a few minutes giving a clear yellow solution.

EXAMPLE 3

The solubility of uranyl hydroxide in carbonate solutions was determined by adding 0.2 g $UO_2(OH)_2.H_2O$ to 20 ml of a solution containing 50 g/l $NaHCO_3$ and 50 g/l $Na_2CO_3$ at 50° C. with stirring. The uranyl hydroxide dissolved completely within about 15 minutes.

EXAMPLE 4

The solubility of uranyl hydroxide in ECM solutions was determined by adding 2.30 g, 1.50 g and 2.16 g of $UO_2(OH)_2.H_2O$ to, respectively, 22.46 g, 9.68 g and 6.95 g of a 50 wt% ECM:water solution (pH=8.5) in stoppered Erlenmeyer flasks and stirring. None of the uranium hydroxide went into solution at room temperature, but when the flasks were heated to 50° C., dissolution did occur as is displayed in TABLE I.

TABLE I

| uranyl hydroxide (g) | mols ECM/ mols uranyl hydroxide | Time required to dissolve | pH of final solution @ 50° C. |
| --- | --- | --- | --- |
| 2.30 | 15/1 | 2 hr 15 min | not measured |
| 1.50 | 10/1 | 3 hr | 9.86 |
| 2.16 | 5/1 | 4 hr 30 min | 10.02 |

The times required to accomplish the dissolution were very long. However, once all the solid material went into solution, it stayed in solution even after cooling to room temperature. The stoichiometry in the last listed preparation approaches that for uranyl tricarbonate complex (i.e., 3/1). However, when a preparation with a 3/1 mole ratio of ECM to uranyl hydroxide was tested for solubility, solid uranyl hydroxide remained even after a 24 hour period had elapsed.

It was, therefore, determined that uranyl hydroxide is quite insoluble in water alone (i.e., without ECM). A 50% ECM/water mixture is almost saturated in ECM at room temperature. However, after this solution has been reacted with uranyl hydroxide and a large fraction of the water removed from the reaction product, no ECM precipitates on cooling the mixture to room temperature. Also, measurements of the carbon dioxide partial pressure in equilibrium with the ECM/uranyl hydroxide solution showed that with the passage of time, the carbon dioxide partial pressure decreases. The preceding three facts establishes that uranyl hydroxide dissolves in ECM/water solutions by virtue of the chemical reaction of the uranyl hydroxide with the ECM. Thus, the observed decrease in carbon dioxide activity implies a concomitant decrease in ECM activity. This means that the ECM has undergone a chemical reaction.

After the $UO_2$ particles have been prepared (i.e., the desired surface accumulation of uranyl hydroxide has been accomplished) in accordance with the practice of this invention, they are reacted with an aqueous solution of amine carbonate, amine carbamate, or mixtures thereof (and, a pore-former, when required) in a batch process conducted in a large toroidal vessel in which solids can be vigorously mixed. In the case of ECM, a 48 wt% ECM aqueous solution can be used. Alumina media are introduced into the vessel to facilitate this mixing. The gas space remaining in the vessel is filled with nitrogen, the vessel is closed gastight and the mixture is reacted for a period of about 1 hour. For the first part of this time, the mixture is agitated vigorously and thereafter it is allowed to stand. Next, hot (about 150° C.) nitrogen gas is blown through the mixture for 30–60 minutes. Thereafter, the $UO_2$ powder with its surface deposits of the binder phase is dumped from the vessel ready for introduction into the pelletizer for the preparation of green pellets. As the final step of the process, the green pellets, or green compacts, are heated suitably in the usual manner with the standard equipment presently in general use in the production of sintered $UO_2$ pellet products.

Thus, having determined that the presence of hexavalent uranium on the surfaces of the nuclear fuel particles includes uranyl hydroxide and this material is a requisite component for the generation of a suitable binder phase, the process of the instant invention provides a reliable method for insuring the presence of a predetermined, reproducible amount of uranyl hydroxide, which in turn is expected to provide an improvement in the binder phase.

What is claimed is:

1. In the method of producing a sintered body of nuclear fuel material wherein at least one amine compound selected from the group consisting of amine carbonates and amine carbamates is added to particulate nuclear fuel material, the mixture is reacted in the presence of water, the resulting particulate nuclear fuel material is pressed to form a green pellet and, thereafter, the pellet is sintered, the improvement of preparing the mixture using particulate nuclear fuel having a predetermined amount of the hydroxide of the metallic element of the nuclear fuel in excess of about 2.0 wt% distributed over the surfaces of said particulate nuclear fuel.

2. The improvement of claim 1 wherein the nuclear fuel is uranium dioxide and the hydroxide is uranyl hydroxide.

3. The improvement of claim 2 wherein the predetermined amount of uranyl hydroxide is in the range of from in excess of about 2 wt% to about 3 wt%.

4. The improvement of claim 2 wherein the particulate nuclear fuel is mixed with an aqueous solution of amine carbamate.

5. The improvement of claim 4 wherein the amine carbamate is ethylene diamine carbamate.

* * * * *